United States Patent
Duffau et al.

(10) Patent No.: US 11,149,586 B2
(45) Date of Patent: Oct. 19, 2021

(54) TURBINE RING ASSEMBLY

(71) Applicant: SAFRAN AIRCRAFT ENGINES, Paris (FR)

(72) Inventors: Clement Jean Pierre Duffau, Moissy-Cramayel (FR); Sebastien Serge Francis Congratel, Moissy-Cramayel (FR); Lucien Henri Jacques Quennehen, Moissy-Cramayel (FR); Nicolas Paul Tableau, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 72 days.

(21) Appl. No.: 16/477,455

(22) PCT Filed: Jan. 5, 2018

(86) PCT No.: PCT/FR2018/050023
§ 371 (c)(1),
(2) Date: Jul. 11, 2019

(87) PCT Pub. No.: WO2018/130766
PCT Pub. Date: Jul. 19, 2018

(65) Prior Publication Data
US 2019/0383166 A1 Dec. 19, 2019

(30) Foreign Application Priority Data

Jan. 12, 2017 (FR) .................................. 1750257

(51) Int. Cl.
*F01D 25/12* (2006.01)
*F01D 11/08* (2006.01)
*F01D 25/00* (2006.01)

(52) U.S. Cl.
CPC .............. *F01D 25/12* (2013.01); *F01D 11/08* (2013.01); *F01D 25/005* (2013.01);
(Continued)

(58) Field of Classification Search
CPC . F01D 9/065; F01D 9/06; F01D 25/00; F01D 25/08; F01D 25/10; F01D 11/08; F05D 2300/6033
See application file for complete search history.

(56) References Cited

U.S. PATENT DOCUMENTS

2003/0133790 A1\* 7/2003 Darkins, Jr. .............. F01D 9/04
415/139
2015/0369077 A1 12/2015 Klasing et al.
(Continued)

FOREIGN PATENT DOCUMENTS

| EP | 3 051 071 A1 | 8/2016 | |
|---|---|---|---|
| WO | WO 2014/123654 A1 | 8/2014 | |
| WO | WO-2014123654 A1 \* | 8/2014 | .............. F01D 11/20 |

OTHER PUBLICATIONS

International Search Report dated Apr. 23, 2018 in PCT/FR2018/050023 filed on Jan. 5, 2018.

*Primary Examiner* — Richard A Edgar
(74) *Attorney, Agent, or Firm* — Oblon, McClelland, Maier & Neustadt, L.L.P.

(57) ABSTRACT

A turbine ring assembly including a ring support structure and a plurality of ring sectors made of ceramic matrix composite material forming a turbine ring, each sector presenting in a first section plane defined by an axial direction and a radial direction of the ring a portion forming an annular base having, in the radial direction, an inner face and an outer face from which there extend two attachment tabs defining between them a circumferentially-open annular cavity, the structure including two radial tabs between which the attachment tabs are held, and at least one injection
(Continued)

orifice for injecting a stream of cooling air into the annular cavity. In a second section plane containing the axial direction and a direction orthogonal to the first section plane, the orifice forms a first feed angle relative to the direction orthogonal to the first section plane, the first feed angle lying in the range −80° to +80°.

9 Claims, 2 Drawing Sheets

(52) U.S. Cl.
CPC .... *F05D 2240/55* (2013.01); *F05D 2260/221* (2013.01); *F05D 2300/6033* (2013.01)

(56) References Cited

U.S. PATENT DOCUMENTS

| | | | |
|---|---|---|---|
| 2016/0186605 A1 | 6/2016 | Briggs et al. | |
| 2016/0222812 A1 | 8/2016 | Sippel et al. | |
| 2017/0183978 A1* | 6/2017 | Eng | F01D 11/08 |
| 2017/0298777 A1* | 10/2017 | Lamusga | F01D 25/28 |

* cited by examiner

TURBINE RING ASSEMBLY

BACKGROUND OF THE INVENTION

The invention relates to a turbine ring assembly comprising a ring support structure, also referred to as a casing and a plurality of ring sectors made of ceramic matrix composite material.

The field of application of the invention is in particular that of gas turbine aeroengines. Nevertheless, the invention is applicable to other turbine engines, e.g. to industrial turbines.

For turbine ring assemblies that are made entirely out of metal, it is necessary to cool all of the elements of the assembly and in particular the turbine ring, which is subjected to the hottest streams. This cooling has a significant impact on the performance of the engine since the cooling stream that is used is taken from the main stream through the engine. In addition, using metal for the turbine ring limits potential for increasing temperature in the turbine, even though that could improve the performance of aeroengines.

In an attempt to solve those problems, proposals have been made for turbine ring sectors to be made of ceramic matrix composite (CMC) material in order to avoid using a metal material.

CMC materials present good mechanical properties that make them suitable for constituting structural elements, and advantageously they conserve those properties at high temperatures. Using CMC materials serves advantageously to reduce the cooling stream that needs to be delivered in operation and thus to improve the performance of a turbine engine. Furthermore, using CMC materials serves advantageously to reduce the weight of turbine engines and to reduce the effect of thermal expansion that is encountered with metal parts.

Nevertheless, CMC materials are very stiff and present mechanical admittance that is low compared with the metal alloys conventionally used.

In addition, in a gas turbine aeroengine, the high pressure turbine ring is confronted with a hot source, the gas flow through passage, and with a cold source that is the cavity between the ring and the casing, referred to below as the "ring cavity".

Specifically, the ring cavity needs to be at a pressure higher than the pressure in the passage so as to avoid air in the passage penetrating and burning metal parts. This overpressure is obtained by taking the air from the compressor and by delivering it into the ring cavity, which explains that this air is "cold", since it has not been heated in the combustion chamber.

This need for overpressure makes it impossible to completely cut off the feed of "cold" air to the ring cavity and thus makes it impossible to omit the cold source. It is therefore impossible to have a ring with temperature that is uniform. Under such circumstances, there are going to be significant temperature gradients, and they will generate mechanical stresses in the ring.

Studies have shown that it is necessary for the temperature gradient to be as radial as possible, i.e. to have axial and tangential temperature gradients that are as small as possible.

One known technique for optimizing cooling of the ring cavity consists in making use of impact: the cooling air passes through a multiply-perforated sheet, which accelerates it, and increases the heat exchange coefficients with the facing surface, which in the present situation corresponds to the top face of the ring. This makes it possible, with a given temperature and a given flow rate of cooling air, to cool a zone of the ring more effectively.

Nevertheless, it is necessary to force air to pass through the sheet. Otherwise, air will not pass through the holes and cooling will be ineffective. On a metal ring, this is achieved by means of welding around the perimeter of the ring.

Transposing that technology to a ring made of CMC is impossible for two reasons.

Firstly, the coefficient of expansion between a metal sheet and a CMC ring is too great. The two parts deform relative to each other too much for retention and sealing to be durable over time.

Secondly, it is impossible to weld parts made of CMC material. The multiply-perforated sheet could be made out of CMC material in order to mitigate the difficulty of the first point. Nevertheless, at present there does not exist any technique for welding/brazing one CMC part to another.

One solution is to make use of the air stream in the ring cavity and to make it operate "smartly" so as to attenuate axial and azimuth gradients. For this purpose, a known technique consists in causing the feed holes of the ring cavity to slope so as to induce a swirl effect and increase the heat exchange coefficients and the effectiveness of cooling on the pad of the ring.

That solution cannot be adapted to the turbine rings present on engines since the presence of walls at each end of the annular ring portion mean that the ring cavity is not axisymmetric, and prevents a flow being established in the cavity that rotates overall, which is why the feed holes are nowadays purely axial.

OBJECT AND SUMMARY OF THE INVENTION

The invention seeks to provide a turbine ring assembly having a ring of ceramic matrix composite material and that provides injection of an air stream into the ring cavity that eliminates the axial temperature gradient.

The invention provides a turbine ring assembly comprising a ring support structure and a plurality of ring sectors made of ceramic matrix composite material so as to form a turbine ring, each ring sector presenting, in a first section plane defined by an axial direction and a radial direction of the turbine ring, a portion that forms an annular base having in the radial direction of the turbine ring both an inner face defining the inside face of the turbine ring and an outer face from which there extend first and second attachment tabs defining between them a circumferentially-open annular cavity, the ring support structure having first and second radial tabs between which the first and second attachment tabs of each ring sector are held, together with at least one injection orifice for injecting a stream of cooling air into the annular cavity.

According to a general characteristic of the invention, in a second section plane containing the axial direction of the ring and a direction orthogonal to the first section plane, said injection orifice forms a first feed angle relative to said direction that is orthogonal to the first section plane, which first feed angle lies in the range −80° to +80°, and preferably in the range −60° to −30°.

The absence of any separating wall between the annular cavities of the ring sectors enables a continuous annular cavity to be formed around the entire circumference of the ring and also makes it possible to generate a revolving flow for the cooling air stream in the annular cavity of the ring.

The first feed angle serves to direct the cooling air stream injected through the ring support structure in a direction of rotation around the ring, as contrasted to injecting it axially, i.e. orthogonally to the circumferential or circular direction of the ring. This makes it possible to force or guide the stream of cooling air that is injected in the circumferential direction of the annular cavity, thereby facilitating the formation of a revolving flow.

In the prior art, the impact sheet fastened directly on the metal ring serves to increase cooling very locally, while the revolving flow generated by the invention serves to increase the overall heat exchange coefficient in the annular cavity and thus improve the thermal profile of the ring. This is done without any need to use an additional part such as an impact sheet. This thus serves to achieve a saving in weight and also in manufacturing time.

In a first aspect of the turbine ring assembly, in said first section plane, the orifice forms a second feed angle relative to the axial direction, which second feed angle is strictly greater than 0° and less than or equal to 30°.

The second feed angle enables the cooling air stream to be directed towards the annular cavity, thereby avoiding interaction with the attachment tab facing the injection orifice.

In a second aspect of the turbine ring assembly, the ring support structure has a plurality of injection orifices regularly distributed over a common circumference of the ring.

This makes it possible to have a revolving flow that is better established and thus presents better uniformity in the cooling of the ring.

In a third aspect of the turbine ring assembly, each ring sector has at least one fluid flow disturber arranged on the outer face of the ring inside the annular cavity.

The fluid flow disturber arranged in the annular cavity of a ring sector serves to create turbulence and thus to increase the heat exchange coefficients with the ring.

In a variant of the third aspect of the turbine ring assembly, each ring sector has a plurality of fluid flow disturbers distributed over the outer face of the ring inside the annular cavity.

The invention also provides a turbine engine including a turbine ring assembly as defined above.

The invention also provides an aircraft including at least one turbine engine as defined above.

BRIEF DESCRIPTION OF THE DRAWINGS

The invention can be better understood on reading the following given by way of non-limiting indication and with reference to the accompanying drawings, in which.

DETAILED DESCRIPTION OF EMBODIMENTS

Figure 1:
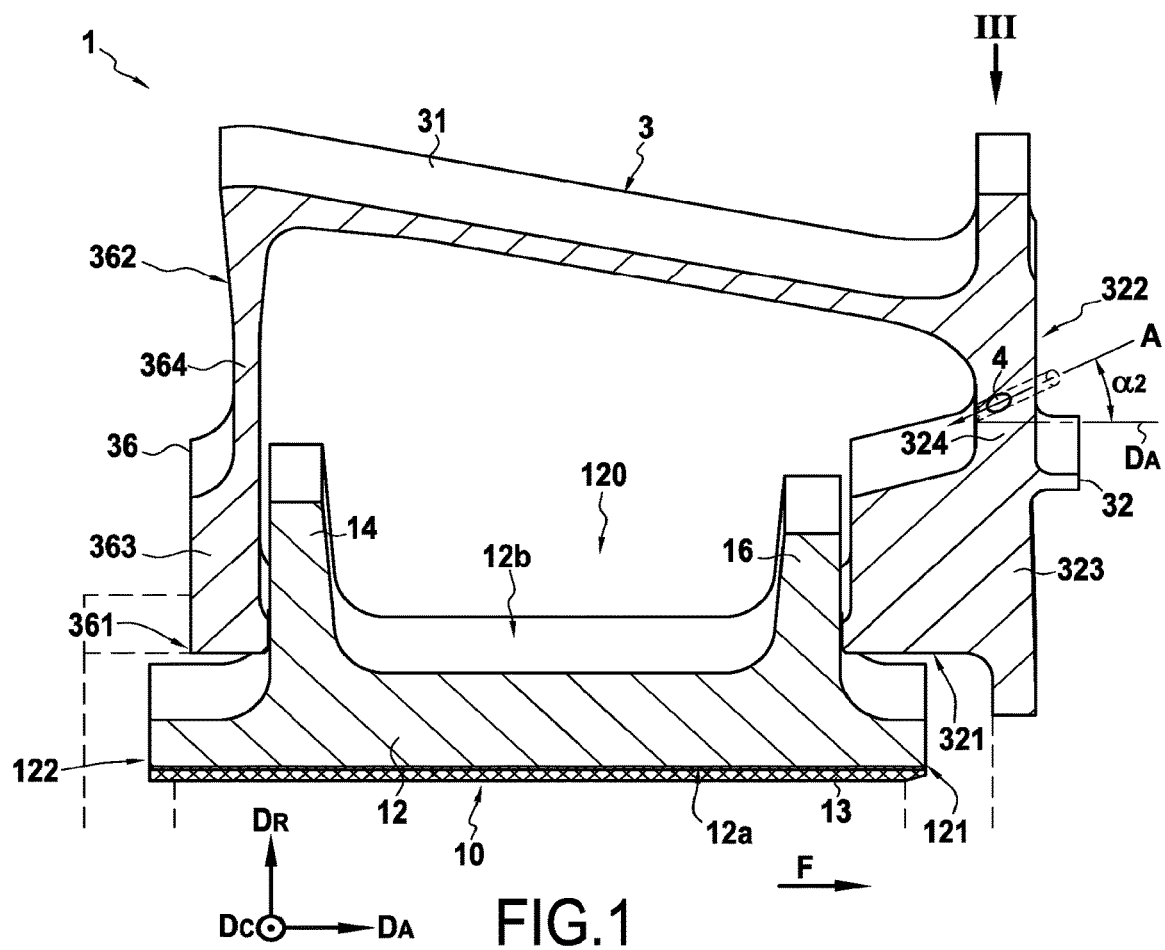
FIG. 1 is a diagrammatic axial section view of a first embodiment of a turbine ring assembly of the invention.

FIG. 1 shows a high pressure turbine ring assembly comprising a turbine ring 1 made of ceramic matrix composite (CMC) material and a metal ring support structure 3. The turbine ring 1 surrounds a set of rotary blades (not shown). The turbine ring 1 is made up of a plurality of ring sectors 10, with FIG. 1 being a view in axial section defined by the axial direction of the turbine ring 1 identified by arrow DA and by the radial direction of the turbine ring 1, identified by arrow DR.

In a first plane (reference I in FIG. 2) defined by the axial and radial directions DA and DR, each ring sector 10 presents a section that is substantially in the shape of an upside-down Greek letter π. Specifically, the section comprises an annular base 12 and upstream and downstream radial attachment tabs 14 and 16. The terms "upstream" and "downstream" are used herein relative to the flow direction of the gas stream through the turbine as represented by arrow F in FIG. 1. The tabs of the ring sector 10 could be of some other shape, the section of the ring sector could be of a shape other than a π-shape, for example it could be a k-shape.

In the radial direction DR of the ring 1, the annular base 12 has an inner face 12a and an outer face 12b that are opposite from each other. The inner face 12a of the annular base 12 is coated in a layer 13 of abradable material that forms a thermal and environmental barrier and that defines a flow passage for the gas stream through the turbine.

The upstream and downstream radial attachment tabs 14 and 16 project in the direction DR from the outer face 12b of the annular base 12 at a distance from the upstream and downstream ends 121 and 122 of the annular base 12. The upstream and downstream radial attachment tabs 14 and 16 extend over the entire width of the ring sector 10, i.e. over the entire circular arc described by the ring sector 10, or indeed over the entire circumferential length of the ring sector 10.

The annular base 12 and the upstream and downstream attachment tabs 14 and 16 of each ring sector 10 together form an annular cavity 120 that is open on a side remote from the annular base 12 and at each circular end of the ring sector 10, i.e. at each end of the ring sector 10 that is in contact with another ring sector 10 when the ring 1 is assembled. The ring 1 also has an annular cavity in fluid flow communication over the entire circumference of the ring 1.

As can be seen in FIG. 1, the ring support structure 3 that is secured to a turbine casing comprises a central band 31 having its axis of symmetry coinciding with the axis of symmetry of the turbine ring 1 when they are fastened together. The central band 31 extends in the axial direction DA of the ring 1 and in the circumferential direction of the ring 1. The structure of the ring support 3 also comprises a downstream annular radial flange 32 and an upstream annular radial flange 36 that extend in the radial direction DR from the central band 31 towards the center of the ring 1 and in the circumferential direction of the ring 1.

As shown in FIG. 1, the upstream annular radial flange 36 has a first end 361 that is free and a second end 362 that is secured to the central band 31. The upstream annular radial flange 36 has a first portion 363 and a second portion 364, the first portion 363 extending between the first end 361 and the second portion 364, and the second portion 364 extending between the first portion 363 and the second end 362. The first portion 363 of the upstream annular radial flange 36 is in contact with the upstream radial attachment tab 14. The second portion 364 is thinner than the first portion 363 so as to give the upstream annular radial flange 36 a certain amount of flexibility, thereby avoiding excessive stressing the turbine ring 1 made of CMC.

In similar manner, the downstream annular radial flange 32 has a first end 321 that is free and a second end 322 that is secured to the central band 31. The downstream annular radial flange 32 has a first portion 323 and a second portion 324, the first portion 323 extending between the first end 321 and the second portion 324, and the second portion 324 extending between the first portion 323 and the second end 322. The first portion 323 of the downstream annular radial flange 32 is in contact with the downstream radial attachment tab 16. The second portion 324 is thinner than the first portion 323 so as to give a certain amount of flexibility to the downstream annular radial flange 32 and thus avoid excessively stressing the turbine ring 1 made of CMC.

In the axial direction DA, the upstream annular radial flange 36 of the ring support structure 3 is separated from the downstream annular radial flange 32 by a distance corresponding to the spacing between the upstream and downstream radial attachment tabs 14 and 16 so as to hold them between the upstream annular radial flange 36 and the downstream annular radial flange 32.

For each ring sector 10, the ring support structure 3 has an injection orifice 4 for injecting a cooling air stream, represented by arrow A, into the annular cavity 120. Each injection orifice 4 is made in the second portion 324 of the downstream annular radial flange 32.

Figure 2:
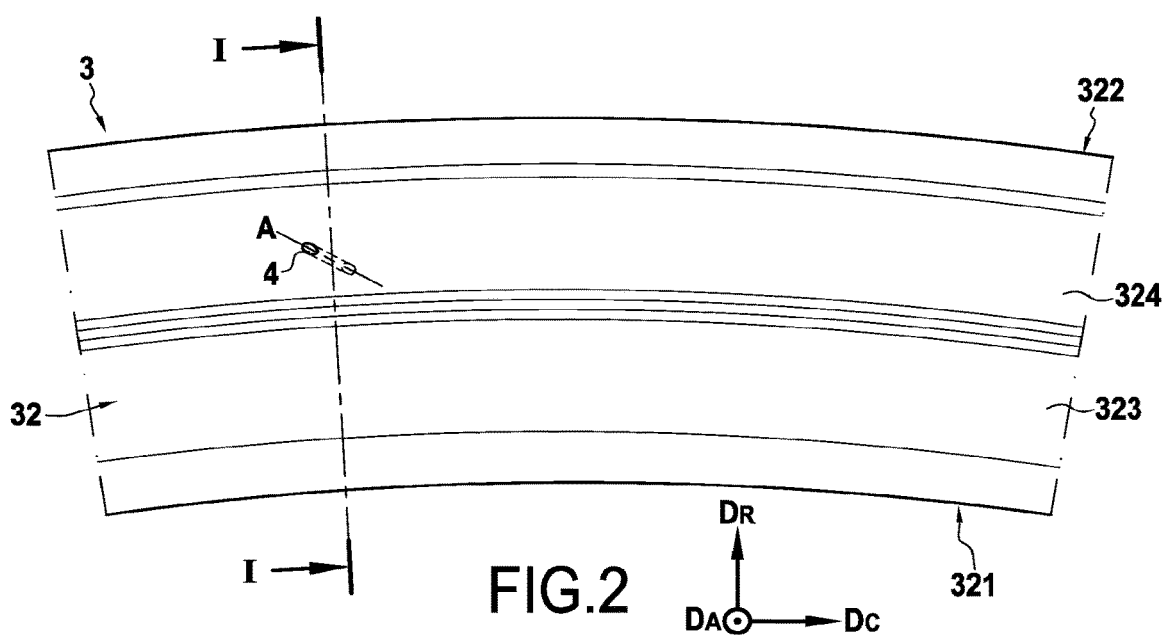
FIG. 2 is a diagrammatic face view of the ring support structure of the FIG. 1 turbine ring assembly.
Figure 3:
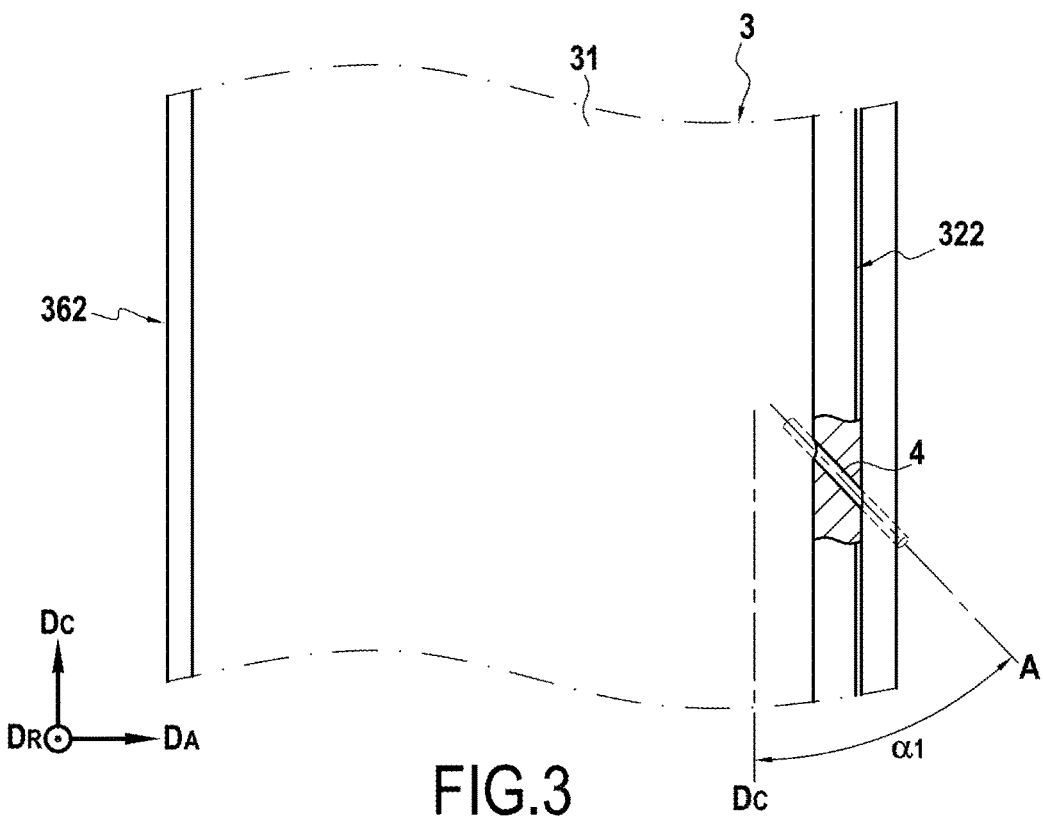
FIG. 3 is a diagrammatic plan view of the ring support structure of the FIG. 1 turbine ring assembly.

FIGS. 2 and 3 are respectively a diagrammatic face view and a diagrammatic plan view of the ring support structure 3 of the FIG. 1 turbine ring assembly.

As shown in FIGS. 2 and 3, the injection orifice 4 presents a direction A that is not orthogonal relative to a second plane in which the downstream annular radial flange 32 extends and that does not lie in a third plane which is orthogonal to the plane in which the downstream annular radial flange 32 extends. The second plane is defined by the radial direction DR and a direction orthogonal to the first plane I. The direction orthogonal to the first plane I is referenced by reference Dc and it corresponds to the tangent to the circumferential direction of the ring at the intersection of the circumferential direction with the first section plane I. Consequently, the direction Dc orthogonal to the first section plane I is referred to as the tangential direction Dc. The third plane is defined by the tangential direction Dc and the axial direction DA.

More precisely, and as shown in FIG. 3, in the third plane, the injection orifice 4 forms a first feed angle α1 relative to the tangential direction Dc, which angle lies in the range −80° to +80° and preferably in the range −60° to −30°. In the embodiment shown in FIGS. 2 and 3, the first feed angle α1 presents a value of 45°.

The first feed angle α1 serves to initiate a direction for the stream of cooling air injected via the injection orifice 4 through the ring support structure 3 that enables a circular flow to be induced in the annular cavity 120 in order to increase the overall heat exchange coefficient in the annular cavity and improve the thermal profile of the ring.

As shown in FIG. 1, in the first plane I defined by the radial direction DR and the axial direction DA, the injection orifice 4 forms a second feed angle α2 relative to the axial direction DA, the second feed angle α2 being strictly greater that 0° and less than or equal to 30°.

The second feed angle α2 serves to direct the cooling air stream towards the annular cavity 120 and thus avoid interaction with the downstream attachment tab 16 and with the upstream attachment tab 14.

Figure 4:
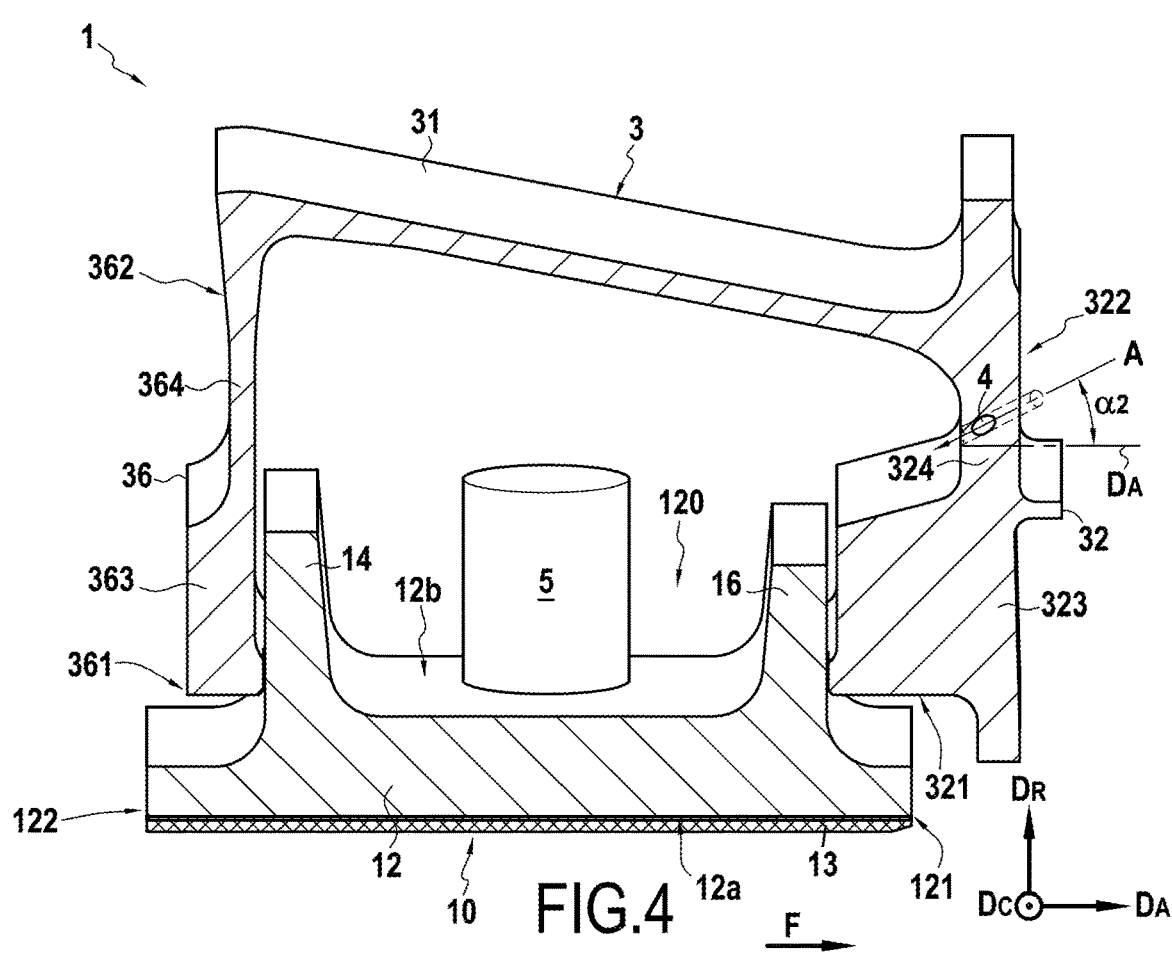
FIG. 4 is a diagrammatic axial section view of a second embodiment of a turbine ring assembly of the invention.

FIG. 4 is a diagrammatic axial section view showing a second embodiment of a turbine ring assembly of the invention.

In this second embodiment, all of the elements that are identical to the first embodiment shown in FIGS. 1 to 3 are given the same numerical references.

The second embodiment differs from the first embodiment in that each ring sector 10 has a fluid flow disturbance block 5 mounted on the outer face 12b of the ring 1 inside the annular cavity 120, i.e. between the upstream and downstream attachment tabs 14 and 16 so as to create turbulence and thus increase the heat exchange coefficients with the ring 1 for each ring sector 10.

There follows a description of a method of making a turbine ring assembly corresponding to that shown in FIG. 1.

Each ring sector 10 as described above is made of ceramic matrix composite (CMC) material by forming a fiber preform of shape close to that of the ring sector and by densifying the ring sector with a ceramic matrix.

In order to make the fiber preform, it is possible to use ceramic fiber yarns, e.g. SiC fiber yarns such as those sold by the Japanese supplier Nippon Carbon under the name "Hi-NicalonS", or else carbon fiber yarns.

The fiber preform is advantageously made by three-dimensional weaving, or by multilayer weaving, and zones of non-interlinking are provided so as to enable the portions of the preforms that correspond to the tabs 14 and 16 to be folded away from the sectors 10.

The weaving may be of interlock type, as shown. Other three-dimensional or multilayer weaves may be used, such as for example multiplain or multisatin weaves. Reference may be made to Document WO 2006/136755.

After weaving, the blank is shaped in order to obtain a ring sector preform for consolidating and densifying with a ceramic matrix, with densification being performed in particular by chemical vapor infiltration (CVI), as is well known. In a variant, the textile preform may be hardened a little by CVI so as to make it sufficiently rigid to be handled, prior to causing liquid silicon to flow into the textile by capillarity in order to perform densification by so-called "melt-infiltration".

A detailed example of making ring sectors out of CMC is described in particular in Document US 2012/0027572.

The ring support structure 3 is made of a metal material, such as a Waspaloy® or Inconel 718 or indeed C263 alloy.

The entire turbine ring is made by mounting the ring sectors 10 on the ring support structure 3. For this purpose, the ring sectors 10 are assembled together on an annular tool of the "spider" type, e.g. comprising suction cups, each configured to hold one ring sector 10. The ring sectors 10 are assembled by inserting inter-sector sealing tongues between each pair of ring sectors. Thereafter, the ring 1 is mounted on the ring support structure 3, which includes an orifice for injecting a stream of cooling air into the annular cavity for each ring sector 10.

The invention thus provides a turbine ring assembly comprising a ring of ceramic matrix composite material, while enabling a stream of air to be injected into the ring cavity so as to eliminate the axial temperature gradient.

The invention claimed is:

1. A turbine ring assembly comprising:
   a ring support structure; and
   a plurality of ring sectors made of ceramic matrix composite material so as to form a turbine ring, each ring sector presenting, in a first section plane defined by an axial direction and a radial direction of the turbine ring, a portion that forms an annular base having in the radial direction of the turbine ring both an inner face defining an inside face of the turbine ring and an outer face from which there extend first and second attachment tabs defining therebetween a circumferentially-open annular cavity,
   wherein the ring support structure includes a central band and first and second radial flanges extending radially inward from the central band and between which the first and second attachment tabs of each ring sector are held, and an injection orifice for injecting a stream of cooling air into the annular cavity, wherein each of the first and second radial flanges includes a first free radial end, a second radial end secured to the central band, a first portion, and a second portion, the first portion extending between the first free radial end and the second portion, the second portion extending between the first portion and the second radial end, a part of the first portion being in contact with one of the first and second attachment tabs in the axial direction, and the second portion being thinner than the first portion, wherein the injection orifice is disposed in the second portion of one of the first and second radial flanges, and wherein, in a second section plane containing the axial direction of the ring and a direction orthogonal to the first section plane, said injection orifice forms a first feed angle relative to said direction that is orthogonal to the first section plane, which first feed angle lies in the range −80° to +80°.

2. The assembly according to claim 1, wherein, in said first section plane, the injection orifice forms a second feed angle relative to the axial direction, which second feed angle is strictly greater than 0° and less than or equal to 30°.

3. The assembly according to claim 1, wherein the ring support structure has a plurality of injection orifices regularly distributed over a common circumference of the ring.

4. The assembly according to claim 1, wherein each ring sector has at least one fluid flow disturber arranged on the outer face of the ring inside the annular cavity.

5. The assembly according to claim 4, wherein each ring sector has a plurality of fluid flow disturbers distributed over the outer face of the ring inside the annular cavity.

6. The assembly according to claim 1, wherein the first feed angle lies in the range −60° to −30°.

7. The assembly according to claim 1, wherein the second radial flange is disposed downstream of the first radial flange, and the injection orifice is disposed in the second portion of the second radial flange.

8. A turbine engine comprising:
a turbine ring assembly comprising
a ring support structure; and
a plurality of ring sectors made of ceramic matrix composite material so as to form a turbine ring, each ring sector presenting, in a first section plane defined by an axial direction and a radial direction of the turbine ring, a portion that forms an annular base having in the radial direction of the turbine ring both an inner face defining an inside face of the turbine ring and an outer face from which there extend first and second attachment tabs defining therebetween a circumferentially-open annular cavity, wherein the ring support structure includes a central band and first and second radial flanges extending radially inward from the central band and between which the first and second attachment tabs of each ring sector are held, and an injection orifice for injecting a stream of cooling air into the annular cavity, wherein each of the first and second radial flanges includes a first free radial end, a second radial end secured to the central band, a first portion, and a second portion, the first portion extending between the first free radial end and the second portion, the second portion extending between the first portion and the second radial end, a part of the first portion being in contact with one of the first and second attachment tabs in the axial direction, and the second portion being thinner than the first portion, wherein the injection orifice is disposed in the second portion of one of the first and second radial flanges, and wherein, in a second section plane containing the axial direction of the ring and a direction orthogonal to the first section plane, said injection orifice forms a first feed angle relative to said direction that is orthogonal to the first section plane, which first feed angle lies in the range −80° to +80°.

9. The turbine engine according to claim 8, wherein the second radial flange is disposed downstream of the first radial flange, and the injection orifice is disposed in the second portion of the second radial flange.

* * * * *